United States Patent
Zhou

(10) Patent No.: US 9,097,790 B2
(45) Date of Patent: Aug. 4, 2015

(54) METHOD AND APPARATUS FOR PROVIDING RADIO FREQUENCY PHOTONIC FILTERING

(75) Inventor: Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 162 days.

(21) Appl. No.: 13/364,401

(22) Filed: Feb. 2, 2012

(65) Prior Publication Data

US 2013/0202305 A1    Aug. 8, 2013

(51) Int. Cl.
*H04B 10/00* (2013.01)
*G02F 1/03* (2006.01)
*G01S 7/282* (2006.01)

(52) U.S. Cl.
CPC ............ *G01S 7/282* (2013.01); *H04B 2210/006* (2013.01)

(58) Field of Classification Search
CPC .......................... G01S 7/282; H04B 2210/006
USPC ......... 398/115–117, 182–214, 85; 455/180.3, 455/260, 265; 331/16; 359/237–324
See application file for complete search history.

(56) References Cited

U.S. PATENT DOCUMENTS

| | | | |
|---|---|---|---|
| 5,101,416 A * | 3/1992 | Fenton et al. | 375/150 |
| 5,777,771 A * | 7/1998 | Smith | 398/182 |
| 5,777,778 A * | 7/1998 | Yao | 359/245 |
| 6,567,436 B1 * | 5/2003 | Yao et al. | 372/32 |
| 6,580,532 B1 * | 6/2003 | Yao et al. | 398/39 |
| 6,594,061 B2 * | 7/2003 | Huang et al. | 359/239 |
| 6,643,417 B2 * | 11/2003 | Strutz et al. | 385/1 |
| 6,762,869 B2 * | 7/2004 | Maleki et al. | 359/239 |
| 6,873,631 B2 * | 3/2005 | Yao et al. | 372/32 |
| 6,906,309 B2 * | 6/2005 | Sayyah et al. | 250/227.11 |
| 7,061,335 B2 * | 6/2006 | Maleki et al. | 331/66 |
| 7,085,499 B2 * | 8/2006 | Yap et al. | 398/183 |
| 7,092,591 B2 * | 8/2006 | Savchenkov et al. | 385/15 |
| 7,187,870 B2 * | 3/2007 | Ilchenko et al. | 398/161 |
| 7,208,990 B1 * | 4/2007 | Hassun | 327/156 |
| 7,269,312 B2 * | 9/2007 | Ng et al. | 385/27 |
| 7,269,354 B1 * | 9/2007 | Silverman et al. | 398/115 |
| 7,324,256 B1 * | 1/2008 | Sayyah | 359/245 |

(Continued)

OTHER PUBLICATIONS

Ozharar et al, Ultra high spur free dynamic range RF synthesis using optical homodyne serrodyne technique, Mar. 1, 2007, Electronic Letters, vol. 43 No. 5, pp. 1-2.*

(Continued)

*Primary Examiner* — Ken Vanderpuye
*Assistant Examiner* — Dibson Sanchez
(74) *Attorney, Agent, or Firm* — Alan I. Kalb; Eric B. Compton

(57) ABSTRACT

A method and apparatus for providing RF-photonic filtering link. Specifically, one embodiment is an apparatus comprising a radio frequency (RF)-photonic filter for filtering an RF signal, where the RF-photonic filter comprises a loop comprising an electro-optical modulator, an optical fiber, a photo detector. Another embodiment is a method of operating an RF-photonic filter comprising applying a reference signal to the RF-photonic filter; selecting a reference frequency for the RF-photonic filter upon the RF-photonic filter locking to the reference frequency, disconnecting the reference signal; and applying an RF input signal to the RF-photonic filter to lock the RF input signal to the RF-photonic filter.

20 Claims, 3 Drawing Sheets

(56) References Cited

U.S. PATENT DOCUMENTS

| | | | |
|---|---|---|---|
| 7,362,927 B1* | 4/2008 | Ilchenko et al. | 385/15 |
| 7,389,053 B1* | 6/2008 | Ilchenko et al. | 398/183 |
| 7,421,168 B1* | 9/2008 | Goutzoulis | 385/50 |
| 7,587,144 B2* | 9/2009 | Ilchenko et al. | 398/183 |
| 7,653,318 B2* | 1/2010 | Li et al. | 398/209 |
| 7,835,650 B2* | 11/2010 | Li et al. | 398/212 |
| 7,853,836 B2* | 12/2010 | Takada | 714/700 |
| 7,877,020 B1* | 1/2011 | Hayes et al. | 398/198 |
| 7,941,059 B1* | 5/2011 | Hayes | 398/203 |
| 8,095,012 B1* | 1/2012 | Karras et al. | 398/115 |
| 8,121,845 B2* | 2/2012 | Kirby | 704/273 |
| 8,135,288 B2* | 3/2012 | Franklin | 398/196 |
| 8,170,384 B1* | 5/2012 | Riza | 385/27 |
| 8,331,008 B1* | 12/2012 | Matsko et al. | 359/247 |
| 8,498,539 B1* | 7/2013 | Ilchenko et al. | 398/115 |
| 8,532,486 B2* | 9/2013 | Stead et al. | 398/66 |
| 8,659,814 B2* | 2/2014 | Matsko et al. | 359/239 |
| 8,897,607 B2* | 11/2014 | DeSalvo et al. | 385/2 |
| 8,971,671 B2* | 3/2015 | Desalvo et al. | 385/2 |
| 2002/0159668 A1* | 10/2002 | Williams et al. | 385/3 |
| 2003/0089843 A1* | 5/2003 | Sayyah et al. | 250/227.21 |
| 2005/0057791 A1* | 3/2005 | Sayyah | 359/245 |
| 2005/0094928 A1* | 5/2005 | Ng et al. | 385/15 |
| 2005/0248823 A1* | 11/2005 | Maleki et al. | 359/245 |
| 2007/0009205 A1* | 1/2007 | Maleki et al. | 385/27 |
| 2007/0224958 A1* | 9/2007 | Nedachi | 455/226.1 |
| 2008/0075464 A1* | 3/2008 | Maleki et al. | 398/85 |
| 2009/0074421 A1* | 3/2009 | Thaniyavarn | 398/116 |
| 2009/0097516 A1* | 4/2009 | Maleki et al. | 372/26 |
| 2009/0135860 A1* | 5/2009 | Maleki et al. | 372/20 |
| 2009/0214223 A1* | 8/2009 | Chen et al. | 398/183 |
| 2009/0263137 A1* | 10/2009 | Hossein-Zadeh et al. | 398/115 |
| 2009/0297155 A1* | 12/2009 | Weiner et al. | 398/115 |
| 2010/0028012 A1* | 2/2010 | Ng | 398/116 |
| 2010/0080564 A1* | 4/2010 | Fujii | 398/115 |
| 2010/0118375 A1* | 5/2010 | Maleki et al. | 359/239 |
| 2010/0230621 A1* | 9/2010 | Rideout et al. | 250/551 |
| 2010/0266289 A1* | 10/2010 | Devgan et al. | 398/147 |
| 2011/0001530 A1* | 1/2011 | Nishi et al. | 327/162 |
| 2011/0150484 A1* | 6/2011 | Wang | 398/115 |
| 2011/0293047 A1* | 12/2011 | Yamabana et al. | 375/340 |
| 2012/0113494 A1* | 5/2012 | Yi et al. | 359/238 |
| 2012/0128372 A1* | 5/2012 | Nakura et al. | 398/155 |
| 2012/0315049 A1* | 12/2012 | Banwell et al. | 398/115 |
| 2013/0188962 A1* | 7/2013 | Middleton et al. | 398/116 |

OTHER PUBLICATIONS

Capmany et al, A Tutorial on Microwave Photonic Filters, Jan. 2006, Journal of Lightwave Technology, vol. 24, Issue 1, pp. 201-229.*
Kitchin, High Performance Regenerative Receiver Design, Nov. 1998, American Radio Relay League, All Document.*

* cited by examiner

METHOD AND APPARATUS FOR PROVIDING RADIO FREQUENCY PHOTONIC FILTERING

GOVERNMENT INTEREST

Governmental Interest—The invention described herein may be manufactured, used and licensed by or for the U.S. Government.

FIELD OF INVENTION

Embodiments of the present invention generally relate to radio frequency signal receivers and, more particularly, to a method and apparatus for providing radio frequency (RF) photonic filtering within an RF receiver.

BACKGROUND OF THE INVENTION

Current radio frequency (RF) receivers operate over large bandwidths and utilize frequency agile techniques to suppress noise and provide high spur-free dynamic range (SFDR) to improve signal reception. Such low noise, high SFDR receivers find use in communication systems as well as radar systems. To operate over large bandwidths and provide high SFDR, these systems utilize multiple receivers and one or more associated antennas in a conjoined, synchronous manner. Each individual receiver with the system is designed to accurately operate over a small bandwidth. Through parallel operation of a plurality of receivers, the system achieves a large reception bandwidth. However, using multiple receivers requires sophisticated command and control techniques to ensure the receivers operate in a synchronous manner.

Furthermore, in high-frequency receiver applications, it is important that every component within the receiver have very low loss to facilitate the accurate reception of signals with very low signal strength. In some situations, a front end of the receiver (high-frequency components) may be co-located with an antenna that is remote from a back end of the receiver (low frequency components). Expensive, low loss RF cables are required to interconnect the front-end and backend of each receiver.

Therefore, there is a need in the art for a method and apparatus for wideband, low loss signal processing of RF signals within RF receivers.

BRIEF SUMMARY OF THE INVENTION

Embodiments of the present invention relate to a method and apparatus for providing RF-photonic filtering. Specifically, one embodiment of the invention is an apparatus comprising a radio frequency (RF)-photonic filter for filtering an RF signal, where the RF-photonic filter comprises a loop comprising an electro-optical modulator, an optical fiber, a photo detector.

Another embodiment of the invention is a method of operating an RF-photonic filter comprising applying a reference signal to the RF-photonic filter; selecting a reference frequency for the RF-photonic filter; upon the RF-photonic filter locking to the reference frequency, disconnecting the reference signal; and applying an RF input signal to the RF-photonic filter to lock the RF input signal to the RF-photonic filter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Embodiments of the present invention comprise a method and apparatus for receiving an RF signal from an antenna and using a RF-photonic filter to provide broadband tuning and extended spur-free dynamic range (SFDR). The RF-photonic filter, operating as a single mode resonator, amplifies the desired RF signal and substantially suppresses other RF input signals, causing signal spurs to be substantially reduced. Additionally, in one embodiment, the RF-photonic filter provides an optical output for coupling RF signals to a remotely located signal processor using a low loss, low cost optical fiber.

Figure 1:
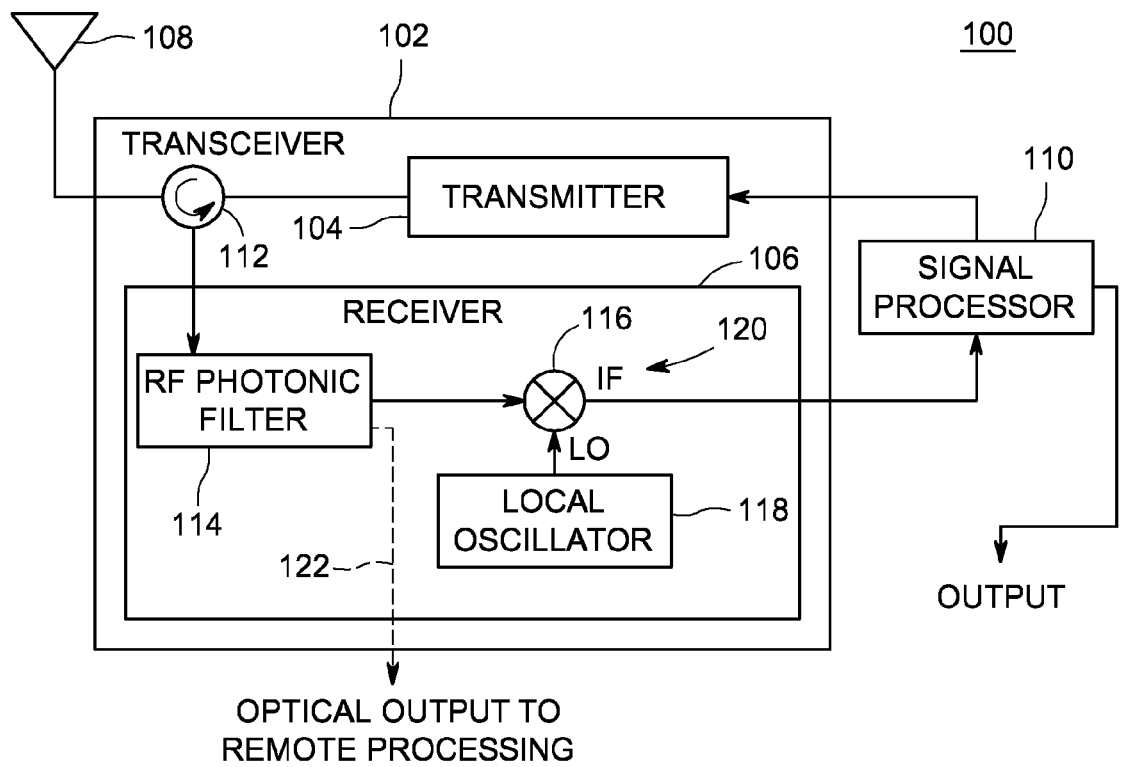
FIG. 1 is a block diagram of an RF signal processing system in accordance with exemplary embodiments of the present invention.

FIG. 1 is a block diagram of an RF signal processing system 100 in accordance with exemplary embodiments of the present invention. The system 100 comprises an antenna 108, a transceiver 102, and a signal processor 110. The transceiver 102 comprises a circulator 112 (or other type of directional coupler), a transmitter 104, and a receiver 106. In operation, RF signals from the local oscillator (LO) 118, may be modulated or processed by the signal processor 110 and coupled to the transmitter 104. Signals from the transmitter 104 are amplified and coupled to the antenna 108 through the circulator 112. In a radar embodiment, the signals are reflected from an object (target) and return to the antenna 108. The received signals are coupled from the antenna 108 through the circulator 112 to the receiver 106. The received signals are coupled through the receiver to the signal processor 110. Information carried by the received signals is provided as an output signal processor.

In one embodiment of the receiver 106, the receiver 106 comprises an RF-photonic filter 114, a mixer 116 and a local oscillator 118. The mixer 116 and the local oscillator 118 operate together as a frequency converter 120. The RF-photonic filter 114 operates as a single mode resonator that amplifies the desired RF signal and suppresses undesired RF input signals. The desired RF signal is coupled to the mixer 106. Through mixing a local oscillator signal from the local oscillator 118 with the RF signal, an intermediate frequency (IF) signal is generated. The IF signal is coupled to the signal processor to facilitate extraction of Information from the received signal.

In other embodiments of the receiver 106, an optical output signal from the RF-photonic filter may be coupled through fiber-optic cable 122 to a remotely located frequency converter and signal processor (not shown). In other embodiments, the receiver 106 may not be co-located with a transmitter to form a transceiver. In such embodiments, the receiver operates autonomously. Any RF receiver utilizing a RF-photonic filter as described herein is considered within the scope of the present invention.

Figure 2:
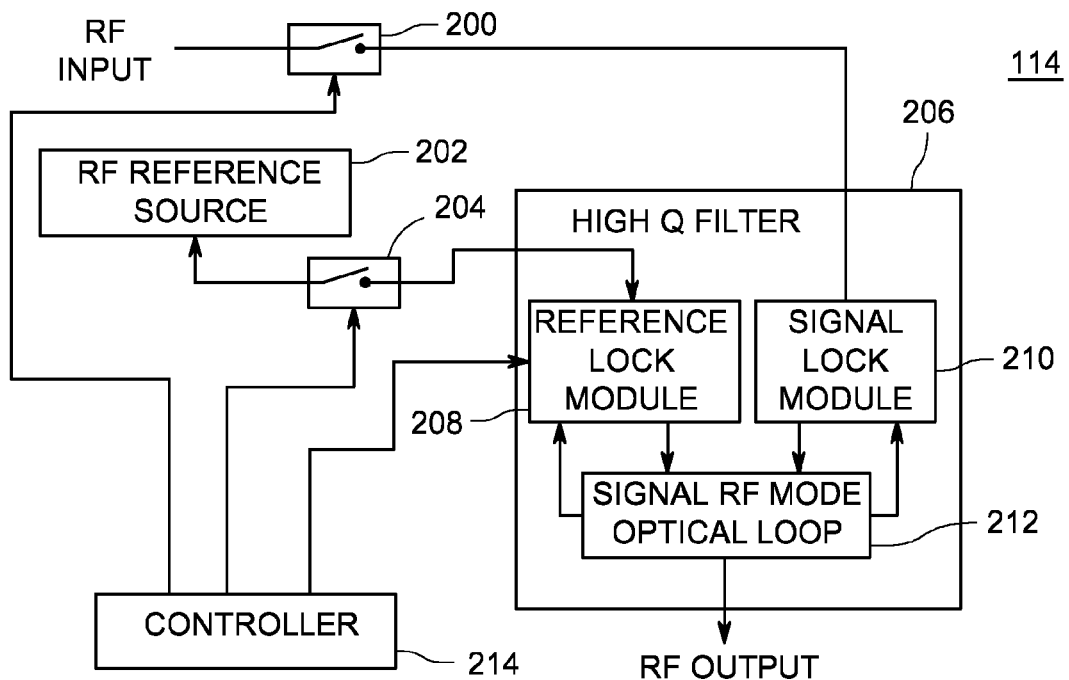
FIG. 2 is a block diagram of an RF-photonic filter in accordance with exemplary embodiments of the present invention.

FIG. 2 is a block diagram the RF-photonic filter 114 in accordance with exemplary embodiment of the present invention. The filter 114 uses photonic technology in combination with RF technology to form a high Q, high SFDR filter for filtering RF signals within the front end of an RF receiver. The RF-photonic filter 114 comprises a first RF switch 200, and RF reference source 202, a second RF switch 204, a high Q filter 206, a reference block module 208, a signal lock module 210, a single RF mode optical loop 212 and a controller 214. The RF input is coupled through the first RF switch 202 the signal lock module 210. The RF reference source 202 is coupled-through the second RF switch 204 to the reference clock module 208. The reference lock module 208 and the signal lock module 210 are coupled to a single RF mode optical loop 212 to form an RF-photonic filter (combining both RF and photonic technologies into a single filter).

In operation, the RF-photonic filter 114 operates in two modes: a first mode is a reference lock mode for coarsely tuning the filter 114 and a second mode is a single lock mode for finely tuning the filter 114. In the reference lock mode, the controller 214 couples the RF reference source 202 to the reference clock module 208 via the RF switch 204. The controller 214 applies a frequency control signal to the reference lock module 208 to select an operating frequency for the filter 206. This operating frequency is approximately equal to the expected frequency of the RF input signal to the receiver. As such, the reference lock module 208 and the single RF mode optical loop 212 form an oscillator having a resonant frequency at the frequency set by the frequency control signal. Thus, the filter 206 is coarsely tuned to the expected frequency of the RF input. Once the filter 206 is locked to the reference signal and oscillating at the selected frequency, the filter 114 switches to the signal lock mode wherein the controller opens the second RF switch 204 and closes the first RF switch 200. In this manner, the RF input signal is coupled to the signal lock module 210 and the RF reference signal is disconnected from the reference lock module 208.

In the signal lock mode, the signal lock module 210 uses the RF input signal to finely tune the filter 206 to center upon the frequency of the RF input signal. The combination of the signal lock module 210 and the single RF mode optical loop 212 form a high Q bandpass filter centered at the center frequency of the RF input signal. The filter can be rapidly retuned to another signal by switching to the reference lock mode and using the controller to change the operating frequency of the reference lock module.

For example, in a radar application, the radar transmission signal may be used as the reference signal to coarsely lock a RF-photonic filter to the frequency of transmission. The reflected signal from an object will have a frequency that is slightly higher or lower than the frequency of transmission. During signal lock mode, the reflected RF signal is rapidly locked and processed by the signal processor. The high Q of the RF-photonic filter facilitates high spur free dynamic range.

Figure 3:
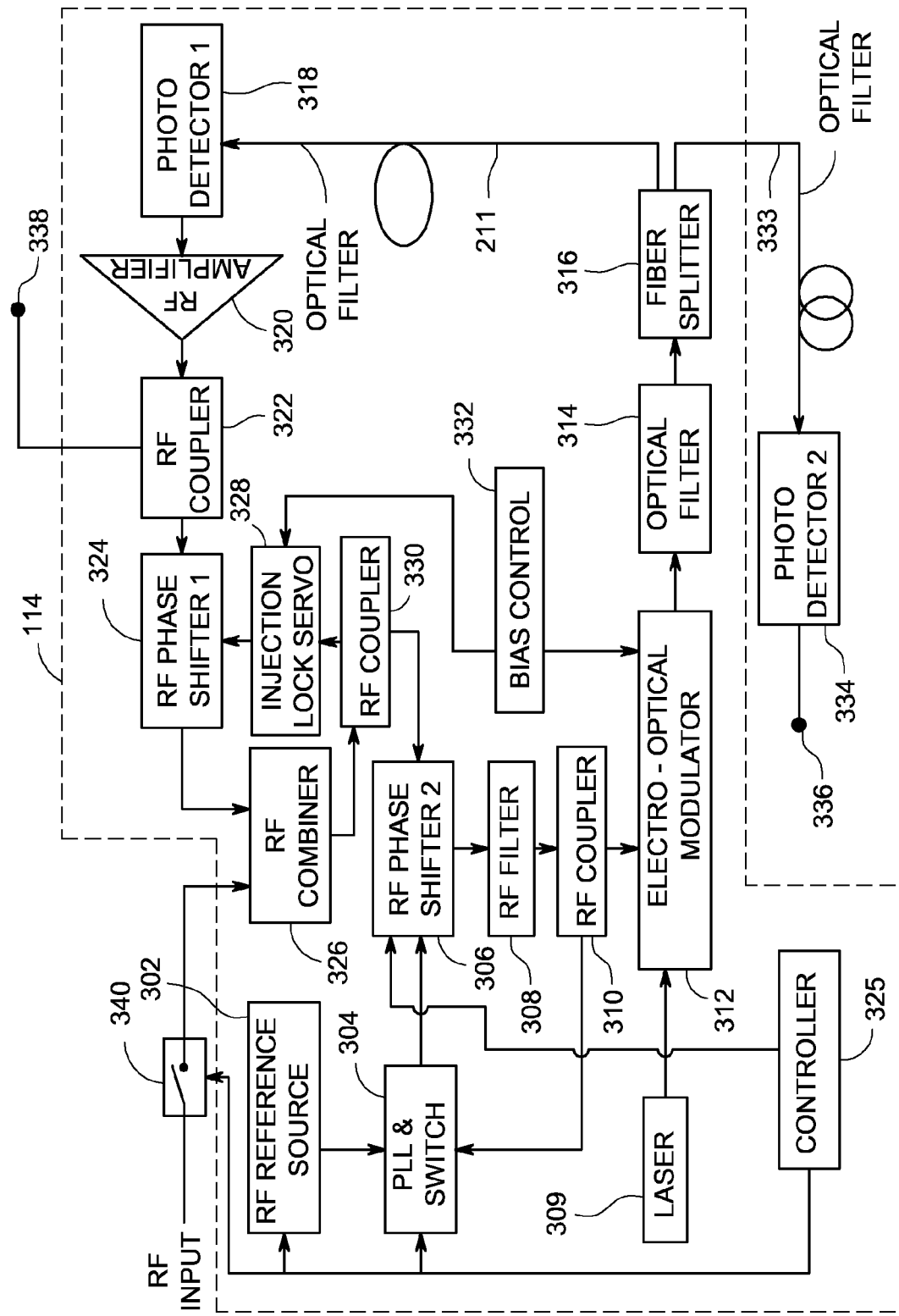
FIG. 3 is a detailed functional block diagram of the RF-photonic filter in accordance with exemplary embodiments of the present invention.

FIG. 3 is a detailed functional block diagram of the RF-photonic filter 114 in accordance with a specific embodiment of the present invention. The RF-photonic filter 114 comprises an RF reference signal source 302, a phase-locked loop (PLL) and switch unit 304, a first RF phase shifter 306, an RF filter 308, an RF coupler 310, an electro-optical modulator 312, a bias control unit 314, a fiber splitter 316, a first photo detector 318, an RF amplifier 320, a second RF phase shifter 324 and an RF combiner 326. The RF reference signal source 302 provides a reference RF signal. The PLL and switch 304 select the reference frequency to apply to the phase shifter 306. In one embodiment, the PLL 304 provides an RF signal equivalent to the carrier signal of the signal that is to be received. The RF Phase Shifter 306 provides tunability of the filter 114. According to exemplary embodiments, the RF filter 308 is not a very narrow filter for bandwidth as it corresponds to the desired receiver system bandwidth.

The RF signal is coupled to the RF filter 308. In one embodiment, the RF filter 308 is a narrow band, band pass filter, e.g., percentage (10%) of a single expected received signal center frequency. In other embodiments, the RF filter 308 has a bandwidth wide enough to pass the expected received RF signal plus any expected carrier frequency tuning. The RF coupler 310 provides a sample of the RF signal exiting the RF filter 308. This sample of RF signal is coupled to the PLL 304 to complete a feedback loop for the PLL 304. In this manner the reference lock module (208 in FIG. 2) comprises the PLL 304, RF phase shifter 306, RF filter 308, and RF coupler 310.

The RF signal is coupled from the RF coupler 310 to the electro-optical modulator 312. The electro-optical modulator 312 modulates the light from the laser 309 with the RF signal. The resulting optical signal is coupled to the optical filter 314 (optional) for wavelength filtering.

The optical signal from the filter 314 is coupled to the fiber splitter 316. According to exemplary embodiments, the fiber splitter 316 splits the filtered optical signal into two signals, one signal is transmitted through the optical fiber link 211 (which may be 10 m to 100 m or longer and has a low Q) to a photo detector 318. The other signal is coupled to an optical fiber 333 to carry the signal to a remote location to provide remote signal output. At the remote location, a photo detector 334 converts the optical signal into an RF signal that can be processed at point 336.

The photo-detector 318 converts the optical signal to an RF signal and sends the RF signal to the RF coupler 320. The photo-detector 318 may optionally send the RF signal to an RF amplifier 320, which further amplifies the signal and couples it to the RF coupler 320. In one embodiment, the photonic link provides enough gain where the amplifier 320 is not needed. The RF coupler 321 taps the RF signal to provide the first RF output signal 338. The RF signal is coupled to the phase shifter 324. Phase shifter 324 is electronically tunable and its output forms one input to the RF combiner 326.

The second input of the RF combiner 326 is the received RF signal from the antenna (108 in FIG. 1) into switch 340. The RF combiner 326 combines both RF signals from the first and second inputs. The output of the combiner 326 is coupled to an RF coupler 330 for coupling a sample of the output of the combiner 326 to the injection lock servo 328. The signal lock module (210 of FIG. 2) comprises the phase shifter 324, RF combiner 326, RF coupler 330, and Insertion lock servo 328. This combination of components is used to fine-tune the filter 114 such that the filter locks to the center frequency of the RF input signal during the signal lock mode.

The bias control unit 332 applies DC bias to the electro-optical modulator 312 and to the injection lock servo 308. DC bias is applied to end used by the electro-optical modulator 312 in a well-known manner to facilitate modulating light with an RF signal. DC bias is applied to the insertion lock servo to offset an accumulated DC bias in the feedback loop within the signal lock module. The output of RF coupler 330 is coupled to a second RF phase shifter 306. The phase shifter is a tunable shifter which is controlled by the electronic servo 308.

The single RF mode optical loop 212 comprises portions of both the reference lock module 208 and the signal lock module 210. Specifically, the loop 212 comprises the RF combiner 326, the phase shifter 306, RF filter 308, electro-optical modulator 312, the optical filter 314, the fiber splitter 316, the optical fiber 311, the photo detector 318, the RF amplifier 320, and the phase shifter 324. According to an exemplary embodiment, the length of optical fiber 311 is predetermined such that only one RF mode can oscillate within the filter 114. All other natural frequency modes of the filter 114 are suppressed, causing the loop 212 to form a single mode cavity or resonator for the RF oscillation. The filter 114 can filter out other strong signals in a close frequency range and amplify the signal of interest, providing a spur-free dynamic range for the receiver. In one example, optical fiber 311 is 100 m in length providing a bandwidth of 10 Mhz for a 10 GHz RF carrier.

Figure 4:
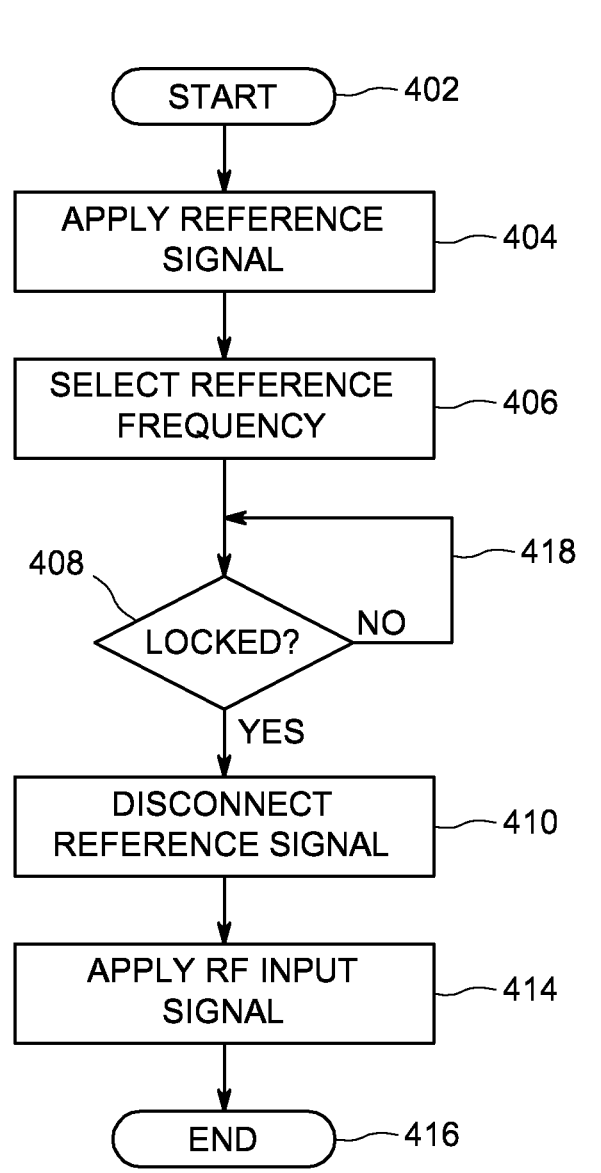
FIG. 4 is a flow diagram of a method of operating the RF-photonic filter in accordance with exemplary embodiments of the present invention.

FIG. 4 is a flow diagram of a method 400 for operating the RF-photonic filter 114 using the controller 325 in accordance with exemplary embodiments of the present invention. The method 400 begins at step 402 and proceeds to step 404 where the RF reference source coupled to the reference lock module to begin the reference lock mode. At step 406, the method 400 uses the PLL to select a reference frequency for the reference lock mode. At step 408, the queries whether the filter has locked to the reference signal. If the query is negatively answered, the method 400 continues in the reference lock mode (path 418). If the query at step 408 is affirmatively answered, the method 400 proceeds to step 410. At step 410, the method 400 disconnects the reference signal and at step 414 applies the RF input signal to the filter. At step 416, the method ends.

The method 400 forms the reference lock mode using steps 402 through 410. Step 414 represents the signal lock mode. If a receiver using the filter of the present invention is required to process a signal at a different frequency, the method 400 can be executed again using a different reference frequency in step 406 that facilitates receiving a different input signal. In this manner the RF-photonic filter of the present invention can be used as a flexible front-end to an RF receiver.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. An apparatus comprising:
    an input connected to an antenna which receives RF signals;
    a RF reference source configured to generate a RF reference signal;
    a RF-photonic filter for filtering RF signals, wherein the RF-photonic filter comprises a loop comprising a light source, an electro-optical modulator, an optical fiber, a photo detector, a tunable phase shifter, and a frequency/phase locking circuit; and
    a controller configured to apply the RF reference signal to the loop to cause the loop to initially resonate at the frequency of the RF reference signal, disconnect the RF reference signal from the loop, and then apply a RF signal received from an antenna to the loop to lock the loop's resonance frequency to the frequency of the received RF signal.

2. The apparatus of claim 1 wherein the RF-photonic filter further comprises:
    a reference lock module in the frequency/phase locking circuit for tuning and locking the filter to the RF reference signal; and
    a signal lock module for injection locking the loop of the RF-photonic filter to a desired RF input signal.

3. The apparatus of claim 2 wherein the reference frequency lock module comprises a phase locked loop circuit for tuning the RF-photonic filter to a reference frequency of the RF reference signal.

4. The apparatus of claim 2 wherein a frequency of the RF reference signal and the frequency of the desired RF input signal are substantially similar.

5. The apparatus of claim 1 wherein the optical fiber has a predetermined length to establish a particular Q for the RF-photonic filter.

6. The apparatus of claim 1 wherein the loop comprises a fiber splitter providing an optical output to enable remote processing of an input signal after passing through the RF-photonic filter.

7. The apparatus of claim 1 wherein the loop supports a single RF mode.

8. The apparatus of claim 1 wherein the loop comprises an RF combiner for combining a RF input signal with a filtered RF input signal.

9. A RF-photonic filter for filtering a RF signal comprising:
    an input configured to provide RF signals received from an antenna;
    a loop operating as a resonator that amplifies a desired input RF frequency signal and suppresses undesired input RF frequency signals;
    a frequency/phase locking circuit included in said loop that is configured to tune the loop to a reference RF frequency corresponding to a reference RF signal by applying the reference RF signal to the loop so as to cause the loop to initially resonate at the reference RF frequency; and
    a controller configured to disconnect the reference RF signal initially provided by the frequency/phase locking circuit to the loop, and then connect a RF signal received from the antenna at the input to the loop to lock the loop's resonance frequency to the frequency of the received RF signal.

10. The RF-photonic filter of claim 9, wherein the loop comprises: a laser, an electro-optical modulator, an optical fiber, a photo detector, an RF-amplifier, a tunable phase shifter and a RF combiner to combine the input RF signal with an RF oscillating signal of the loop.

11. The RF-photonic filter of claim 9, wherein the loop comprises at least one RF coupler configured to provide an RF output of the filtered RF signal and for use in the frequency/phase locking circuit.

12. The RF-photonic filter of claim 9, wherein the loop comprises a fiber splitter configured to provide an optical output of the filtered RF signal.

13. The RF-photonic filter of claim 12, wherein the fiber splitter couples an optical representation of an RF signal to a second photo detector via an optical cable.

14. The RF-photonic filter of claim 13, wherein the second photo detector converts the optical representation of an RF signal to a second RF signal for time delay or remotely transporting the RF signal.

15. The RF-photonic filter of claim 9, wherein the frequency/phase locking circuit comprises: a phased-locked loop (PLL) configured to select the reference RF signal, and a switch configured to apply either the reference RF frequency or an input signal to the loop.

16. The RF-photonic filter of claim 9, wherein the controller is configured to determine when a frequency of the reference RF signal and the frequency of the RF signal at said desired input RF frequency are substantially similar, and based on said determination, to execute said disconnecting of the reference RF signal and said connecting of the RF signal to the loop.

17. The RF-photonic filter of claim 9, further comprising a RF reference source configured to generate the RF reference signal.

18. A method for operating the RF-photonic filter of claim 9 comprising:
  tuning the loop to the reference RF frequency; and
  subsequently locking the loop to the frequency of the received RF signal.

19. The method of claim 18, further comprising:
  upon tuning the loop to the reference RF frequency, disconnecting the reference RF signal from the loop; and
  connecting the received RF signal to the loop.

20. The method of claim 18, further comprising: selecting the reference RF frequency for tuning the loop.

* * * * *